Oct. 23, 1928.

E. H. BRISTOL 1,689,182

SEPARABLE ARM CONSTRUCTION FOR MEASURING INSTRUMENTS

Filed Nov. 19, 1927

Inventor:
Edgar H. Bristol
by Emery, Booth, Janney & Varney
Attys

Patented Oct. 23, 1928.

1,689,182

UNITED STATES PATENT OFFICE.

EDGAR H. BRISTOL, OF FOXBORO, MASSACHUSETTS, ASSIGNOR TO THE FOXBORO COMPANY, OF FOXBORO, MASSACHUSETTS, A CORPORATION OF MASSACHUSETTS.

SEPARABLE-ARM CONSTRUCTION FOR MEASURING INSTRUMENTS.

Application filed November 19, 1927. Serial No. 234,468.

This invention relates to measuring instruments and the object is to make provision in such an instrument for the ready disengagement, for purposes of repair or replacement, of driving and driven elements thereof. In particular I provide that the disengagement may be effected in such manner that little or no strain is placed upon the delicate measuring instrumentality or associated mechanism of the driving train. I also provide a device insuring definiteness of alignment and of operative dimension in the engaged parts.

The invention finds a particular field of application in an instrument having an index; such as a pointer; a set arm; or, in the case of a recording instrument, a pen arm; and for purposes of definiteness I have here illustrated as a specific embodiment of my invention a recording instrument having a pen arm which may be removed for repair or replacement if bent, corroded or otherwise injured. In the accompanying drawings illustrating such specific embodiment of my invention—

Figure 1:
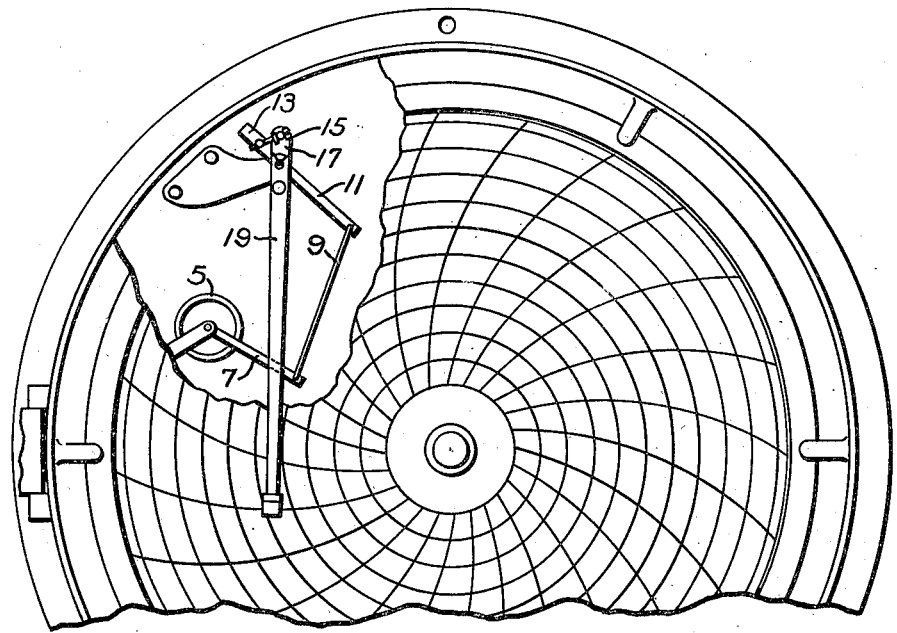
Fig. 1 is a partial front elevation of a recording gage having a part broken out.

Referring to Fig. 1, I have there shown a recording instrument of well known form having a clock-rotated polar chart on which are recorded the fluctuations of a variable as measured by the reaction of a suitable measuring instrumentality, herein a helical Bourdon tube 5, which turns crank 7 which is connected by the arm 9 to a parallel crank 11. This parallel crank rotates a U-shaped shaft 13 embracing the edge of the chart, and adjustable about the center of motion thereof by means of the adjusting screw 15 is a base for supporting the pen arm in the form of a stub 17 to which is removably attached the pen arm body 19 carrying the pen which marks on the chart.

Pen arms for delicate recording instruments must function in such a manner that an uninterrupted record of the movements of the measuring instrumentality is secured although a very limited amount of power from such an instrumentality is ordinarily available. This presumes a pen arm sufficiently flexible to follow any irregularities of the chart and yet sufficiently rigid to prevent errors in the record. The delicate nature of such a pen arm makes injury very possible and it is therefore very desirable to provide a removable pen arm to provide for replacement when injured by accident or when impaired by use, for example, on account of corrosion by the marking ink. In accordance with my invention I provide a removable pen arm having desirable characteristics of interchangeability, ease of manufacture, simplicity of adjustment, no tools being required in the example shown, a construction permitting change with practically no strain upon the measuring instrumentality, a construction providing perfect definiteness of alignment of the removable pen arm section with its supporting stub, and a perfect definiteness of length so that the pen is positioned at the proper distance from the center of motion.

The means here shown for securing the pen arm 19 are in the nature of a snap fastener and in the embodiment shown I utilize the resilient flexibility of the light metal strip from which the pen arm 19 is made to provide the necessary snap action. I also prefer to provide a suitable abutment means between the pen arm and its stub to define the position thereof, the snap fastener elements proper being engaged as these abutment means are brought together and serving to hold them together and with the parts in proper relative position.

Figure 2:
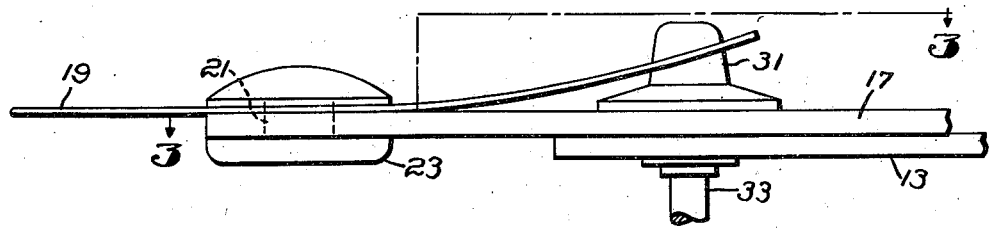
Fig. 2 is an enlarged side elevation showing the connection between the pen arm and its mounting.
Figure 3:
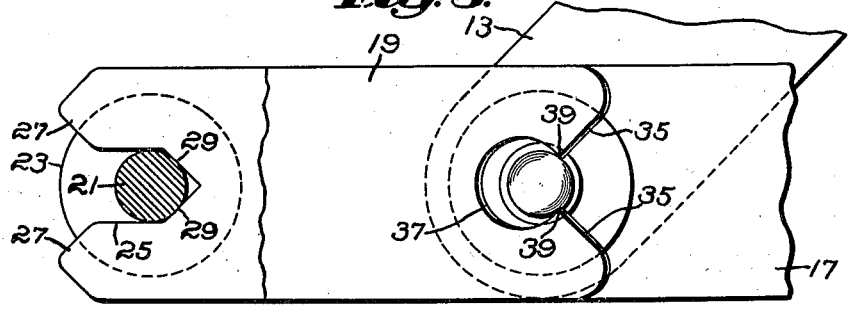
Fig. 3 is a section on the line 3—3 of Fig. 2.

Referring particularly to Figs. 2 and 3 of the drawings, in the form of the invention shown the pen arm 19 is provided at a distance from its butt end with a button having a neck 21 and an enlarged head 23 while the stub 17 is provided at one end with an open-ended slot 25, the walls of the slot being flared at 27 to facilitate the introduction of the neck 21 of the button therein, this slot being here shown as provided at its bottom with angular surfaces 29 which provide a centering bearing for the neck when entered in the slot. The large head 23 of the button at either side of the slot overlies the body of the stub which is closely confined between such head and the pen arm body 19.

The butt end of the arm 19 extending beyond the location of the button provides a resilient extension which in the illustrated form of the invention provides a socket member cooperating with a suitable stud member 31 on the stub 17, this stud member in the present instance having a conoidal form and conveniently being formed as shown as a part of the trunnion bearing 33 of shaft 13 and of the pivot on which the stub 17 is mounted. The cooperating socket on the end of arm 19 may be provided by bifurcating the same in such manner as to provide the converging entrance 35 at the extremity of the yieldable extension and an enlarged recess 37, the two defining between them the opposed prongs or points 39.

When the arm 19 is to be engaged with the stub it is moved longitudinally therealong and the surfaces 27 guide neck 21 into the slot 25. In this movement the stud 31 will be guided between the converging surfaces at 35 and the prongs 39 will ride up along the nearer side of the cone, flexing the extension of the arm upwardly, viewing Fig. 2. As the neck of the stud approaches its bearing in the slot, the prongs 39 will ride over the top of the stud and then travel down the further side thereof by the resilient reaction of the extension, engaging the parts and exerting a longitudinal tension tending to draw the neck of the stud into position and hold it in abutting relation to its bearing.

It will thus be seen that the pen arm is definitely positioned and centered on the base member or stub 17. The arm may be easily applied or removed by a longitudinal pull which will exert very little strain upon the principal portions of the movement and has no tendency to bend or distort the arm 19 itself. Since the stud 31 is located in a position axially spaced from the button 21 in the engaged position of the parts, a lever arm is provided which adequately resists the strain on the pen as it swings over the face of the chart which might tend to rotate it about 21 as a center.

I have described in detail the particular embodiment of my invention shown but it will be understood that this is illustrative merely and that the application of my invention and the mechanical construction utilized in its embodiment might be widely varied from the specific disclosure without departing from the principles of the invention. What I claim as new and desire to secure by Letters Patent I shall express in the following claims.

Claims:

1. In a measuring instrument, a two part index arm, the elements thereof having abutting portions and respectively provided with elements of a resilient separable fastener arranged to be engaged and released by a force exerted longitudinally of the arm and when engaged serving to hold said abutting portions together.

2. In a measuring instrument, a two part index arm, one element thereof having a forked end and the other adapted to overlap thereon and having a button with a neck adapted to enter and be positioned by the fork, and a separable snap fastener remote from said button for securing the elements together in such position.

3. In a measuring instrument, a two part index arm, the elements thereof having cooperating abutment portions and one having a resilient extension, one element having a recess and the other having a conoidal part adapted to enter the recess by flexure of said extension and by its reaction on the wall thereof on the resilient return of said extension to draw the abutment portions into engagement.

4. A construction as defined in claim 3 wherein said abutment portions are cooperatively shaped relatively to center the parts of the arm.

5. In a measuring instrument, the index construction comprising a driven member and an index arm secured thereto by a snap connection adapted to be engaged and disengaged by a force exerted longitudinally of the arm.

6. In a measuring instrument, a two part index arm, the elements thereof having cooperating abutting portions and respectively provided with elements of a resilient separable fastener adapted to engage as said portions approach and reacting by their engagement to draw them together.

7. In an instrument of the class described a driven stub and an index arm detachably secured thereto by a separable snap fastener.

8. In a measuring instrument, an arm and a base member to which it is secured, one of said parts having an open-ended slot and the other a button having a neck closely fitting the slot and a large head to overlie closely the cooperating part, one of said parts also having a resiliently flexible extension, said extension and the other part having stud and socket elements thereon adapted to snap together by virtue of the resiliency of the extension as said button is engaged in the slot.

9. In a measuring instrument, an arm and a base member to which it is secured, one of said parts having an open-ended slot and the other a button having a neck closely fitting the slot and a large head to overlie closely the cooperating part, one of said parts also having a resiliently flexible extension, said extension and the other part having stud and socket elements thereon adapted to snap together by virture of the resiliency of the extension as said button is engaged in the slot and cooperatively formed to exert by their engagement a tension tending to seat said neck in the said slot.

10. In a measuring instrument, an arm and a base member to which it is secured, one of said elements having an open-sided bearing and the other a support to be engaged therein, and one element having a flexible extension, the other element and said extension being provided with a cooperating recess and a conoidal member, the latter adapted to enter the recess by flexure of said extension and by its reaction on the wall thereof on the resilient return of said extension to retain said support in the bearing.

11. In a measuring instrument, an arm and a base member to which it is secured, one of said elements having an open-sided bearing and the other a support to be engaged therein, one element also carrying a conoidal member and the other laterally resilient arms having opposed points adapted to ride over said member as said support is introduced in the bearing and to snap down along the further side thereof.

12. In a measuring instrument, a base member for an index arm having a slot in its end provided with centering walls, an index arm in the form of a flat resiliently flexible strip carrying at a distance from its end a button having a neck to enter the slot and be centered by said walls and a large head closely to confine said base member between the head and the strip, said strip being slotted at its end to provide a converging throat and an enlarged recess defining between them opposed prongs and said base having a conoidal member down the remote side of which said prongs are adapted to ride as said neck bottoms in the slot.

13. In a measuring instrument, an arm and a base member to which it is secured, said elements having cooperating bearings and also carrying respectively the elements of a snap fastener adapted to be engaged to hold said bearings in contact and located at a distance therefrom to provide a lever arm resisting relative movement of said parts about the bearing by the strain to which said arm is subjected in operation of the instrument.

In testimony whereof, I have signed my name to this specification.

EDGAR H. BRISTOL.